United States Patent
Kellner et al.

(10) Patent No.: US 12,552,463 B2
(45) Date of Patent: Feb. 17, 2026

(54) VEHICLE HAVING A BULKHEAD FOR A GAS CHANNEL BETWEEN A BATTERY SYSTEM AND AN UNDERRIDE PROTECTION PLATE

(71) Applicant: Dr. Ing. h.c. F. Porsche Aktiengesellschaft, Stuttgart (DE)

(72) Inventors: Philipp Kellner, Renningen-Malmsheim (DE); Christopher Volkmer, Niefern-Öschelbronn (DE); Simon Frieß, Kuchen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 445 days.

(21) Appl. No.: 18/115,052

(22) Filed: Feb. 28, 2023

(65) Prior Publication Data
US 2023/0286595 A1    Sep. 14, 2023

(30) Foreign Application Priority Data
Mar. 9, 2022    (DE) ............... 10 2022 105 536.1

(51) Int. Cl.
*B62D 25/20*    (2006.01)
*B60L 50/60*    (2019.01)
*B62D 21/15*    (2006.01)

(52) U.S. Cl.
CPC ......... B62D 25/2072 (2013.01); B62D 21/15 (2013.01); B60L 50/66 (2019.02)

(58) Field of Classification Search
None
See application file for complete search history.

(56) References Cited

U.S. PATENT DOCUMENTS 5,620,057 A * 4/1997 Klemen ............. B60K 11/06
                                                    180/68.5
9,281,505 B2 * 3/2016 Hihara .............. B62D 25/20
(Continued)

FOREIGN PATENT DOCUMENTS

CN       105826493 B  *  5/2021  .......... H01M 50/291
DE    102011100626 A1    11/2012
(Continued)

OTHER PUBLICATIONS

Translation of CN 105826493A (Year: 2021).*
(Continued)

*Primary Examiner* — Amy R Weisberg
*Assistant Examiner* — Veronica M Condo
(74) *Attorney, Agent, or Firm* — Buchanan Ingersoll & Rooney PC

(57) ABSTRACT

A vehicle, in particular having an electric drive, wherein the vehicle includes a battery system and an underride protection plate. The underride protection plate is arranged in the vehicle at least partially under the battery system. A gas channel is configured between the battery system and the underride protection plate. The underride protection plate includes at least one bulkhead having a first edge, at which the bulkhead is attached to the underride protection plate. The bulkhead extends from the first edge in the direction of the battery system to a second edge. The bulkhead at least partially forms a part of the gas channel. The bulkhead is configured so as to be foldable in the event of an upwards mechanical load on the underride protection plate at the first edge or between the first edge and the second edge.

17 Claims, 3 Drawing Sheets

(56) References Cited

U.S. PATENT DOCUMENTS

| | | | |
|---|---|---|---|
| 2014/0322583 A1* | 10/2014 | Choi | B60L 50/64 |
| | | | 429/120 |
| 2015/0135940 A1* | 5/2015 | Rawlinson | H01M 10/625 |
| | | | 89/36.08 |
| 2016/0093931 A1 | 3/2016 | Rawlinson et al. | |
| 2020/0161717 A1 | 5/2020 | Fritz et al. | |
| 2020/0180417 A1 | 6/2020 | Marquez Duran et al. | |
| 2021/0111386 A1 | 4/2021 | Kellner et al. | |

FOREIGN PATENT DOCUMENTS

| | | | | |
|---|---|---|---|---|
| DE | 102016207231 A1 | 11/2017 | | |
| DE | 102018210307 A1 | 1/2020 | | |
| DE | 102020102221 A1 | 8/2021 | | |
| DE | 102021005538 A1 | 12/2021 | | |
| GB | 2598350 A * | 3/2022 | | H01M 10/643 |
| JP | 2009035094 A | 2/2009 | | |
| WO | WO-2022143064 A1 * | 7/2022 | | H01M 10/613 |

OTHER PUBLICATIONS

Translation of WO 2022143064 (Year: 2022).*
Swedish Office Action with Search Report for Application No. 2350213-1, dated Oct. 12, 2023 with translation, 9 pages.

* cited by examiner

VEHICLE HAVING A BULKHEAD FOR A GAS CHANNEL BETWEEN A BATTERY SYSTEM AND AN UNDERRIDE PROTECTION PLATE

CROSS-REFERENCE TO RELATED APPLICATION

This application claims priority to German Patent Application No. 10 2022 105 536.1, filed Mar. 9, 2022, the content of such application being incorporated by reference herein in its entirety.

FIELD OF THE INVENTION

The invention relates to a vehicle having a bulkhead for a gas channel between a battery system and an underride protection plate.

BACKGROUND OF THE INVENTION

DE 102018210307 A1, which is incorporated by reference herein, discloses a vehicle in which, in the case of a thermal event, a gas channel for ventilation of the battery system is provided, which is arranged between the underride protection and the battery system and is provided with bulkheads or flaps for the gas guiding.

SUMMARY OF THE INVENTION

A vehicle, in particular having an electric drive, comprises a battery system and an underride protection plate, wherein the underride protection plate is arranged in the vehicle at least partially under the battery system, wherein a gas channel is configured between the battery system and the underride protection plate, wherein the underride protection plate comprises at least one bulkhead, wherein the bulkhead comprises a first edge, at which the bulkhead is attached to the underride protection plate, wherein the bulkhead extends from the first edge in the direction of the battery system to a second edge, wherein the bulkhead at least partially forms a part of the gas channel, wherein the bulkhead is configured so as to be foldable in the event of an upwards mechanical load on the underride protection plate at the first edge or between the first edge and the second edge. The bulkhead is configured so as to guide gas between the battery system and the underride protection plate and cannot be locally pushed into the battery system in the case of an upwards mechanical load, e.g. in the event of an accident.

Preferably, the bulkhead is attached to the underride protection plate via a region that is flexible in material and/or shape.

Preferably, in the flexible region, the bulkhead has a return force that pushes the second edge in a direction towards the battery system.

Preferably, the bulkhead comprises a seal, which is arranged at least partially on the second edge so as to face the battery system.

Preferably, the bulkhead is arranged diagonally in its installation position, which leads to an enhancement of a contact pressure of the seal on the battery system.

Preferably, in its installation position, the bulkhead is arranged at an angle to the underride protection plate that is different from 90°, wherein the gas channel tapers in the direction of the second edge. The bulkhead is erected by the gas pressure in the gas channel. This pushes the second edge in the direction of the battery system. If the seal has been provided, it is pushed against the battery system.

Preferably, the bulkhead in its installation position extends diagonally from the battery system to the underride protection plate, wherein the bulkhead is configured so as to be foldable away in the direction of the underride protection plate at the first edge or between the first edge and the second edge.

Preferably, the bulkhead has a target breaking point at the first edge or between the first edge and the second edge that extends at least partially in the direction of the first edge and/or the second edge.

Preferably, the target breaking point is configured so as to break upon a folding of the bulkhead from a predetermined deformation of the bulkhead in the region of the target breaking point.

BRIEF DESCRIPTION OF THE DRAWINGS

Further advantageous embodiments of the invention will emerge from the following description and the drawing. The drawing shows.

DETAILED DESCRIPTION OF THE INVENTION

Figure 1:
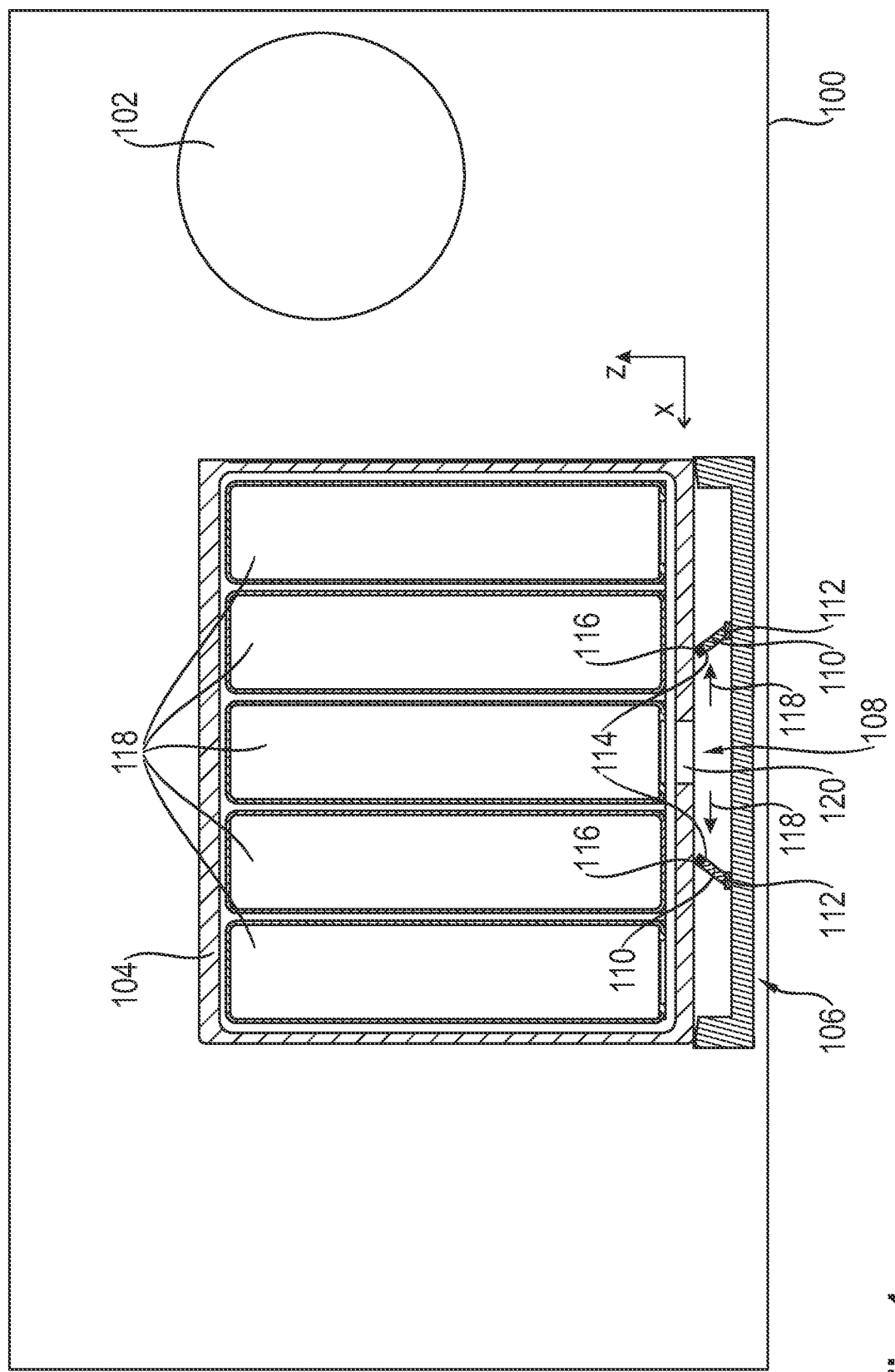
FIG. 1 a side view of a vehicle with a bulkhead in its installation position, FIG. 2 a side view of the vehicle with the bulkhead in a folded position, FIG. 3 a top view of an underride protection plate.

In FIG. 1, a side view of a vehicle 100 is shown.

In the example, the vehicle 100 comprises an electric drive 102, a battery system 104, and an underride protection plate 106. In the example, the battery system 104 and the underride protection plate 106 extend in an x-direction and in a y-direction of a Cartesian coordinate system.

The underride protection plate 106 is arranged in the vehicle 100 at least partially in a z-direction of the Cartesian coordinate system under the battery system 104.

A gas channel 108 is configured between the battery system 104 and the underride protection plate 106.

The underride protection plate 106 comprises at least one bulkhead 110. The bulkhead 110 at least partially forms a part of the gas channel 108. For example, the bulkhead 110 forms a part of a wall of the gas channel 108.

The bulkhead 110 comprises a first edge 112, at which the bulkhead 110 is attached to the underride protection plate 106.

The bulkhead 110 extends from the first edge 112 in the direction of the battery system 104 to a second edge 114.

The bulkhead 110 is configured so as to be foldable. In the example, the bulkhead 110 is configured so as to fold at the first edge 112 in the event of an upwards mechanical load on the underride protection plate 106. It can also be provided that the bulkhead 110 is configured so as to fold between the first edge 112 and the second edge 114.

In the example, the bulkhead 110 is attached to the underride protection plate via a region that is flexible in terms of its material. It can also be provided that the bulkhead 110 is attached to the underride protection plate via a region that is flexible in terms of its shape. It can also be provided that the bulkhead 110 is attached to the underride protection plate via a region that is flexible in terms of its material and its shape.

In the example, the bulkhead 110 comprises a seal 116 which is arranged at least partially on the second edge 114 so as to face the battery system 104. The bulkhead 110 can also be configured without a seal 116.

In the example, the bulkhead 110 abuts the battery system 104 in its installation position via the seal 116. It can also be provided that the bulkhead 110 does not abut, or only partially abuts, the battery system in its installation position.

In the example, the bulkhead 110 in its installation position extends diagonally from the battery system 104 to the underride protection plate 106. The bulkhead 110 is configured so as to fold away in the direction of the underride protection plate 106 at the first edge 112 or between the first edge 112 and the second edge 114.

In the example, the bulkhead 110 is arranged diagonally in its installation position, which leads to an enhancement of a contact pressure of the seal 116 on the battery system 104.

In the example, the bulkhead 110 in its installation position is arranged at an angle to the underride protection plate 106 that is different from 90°. For example, the gas channel 108 tapers toward the second edge 114.

It can also be provided that the bulkhead 110 is arranged at an angle of 90° to the underride protection plate 106.

In the example, the bulkhead 110 is erected by the gas pressure in the gas channel, insofar as a gas pressure is created in the gas channel 108. As a result, the second edge 114 is pushed towards the battery system 104. Insofar as the seal 116 is provided, it is pushed onto the battery system 104.

In the example, the bulkhead 110 in its installation position has a return force 118 in the flexible region that pushes the second edge 114 towards the battery system 104.

In the example, the battery system 104 comprises a plurality of cells 118. In case of a thermal event, gas can escape from a damaged cell 118 into the gas channel 108 via a degassing region 120. As a result, the gas escapes from the battery system 104 and, as long as it is hot, does not mix with too much oxygen, and cools outside of the battery system 104.

In the example, in case of an accident resulting in deformation of the underride protection plate 106, the cells 118 are additionally protected as the bulkhead 110 folds rather than penetrating into one or more of the cells 118.

Figure 2:
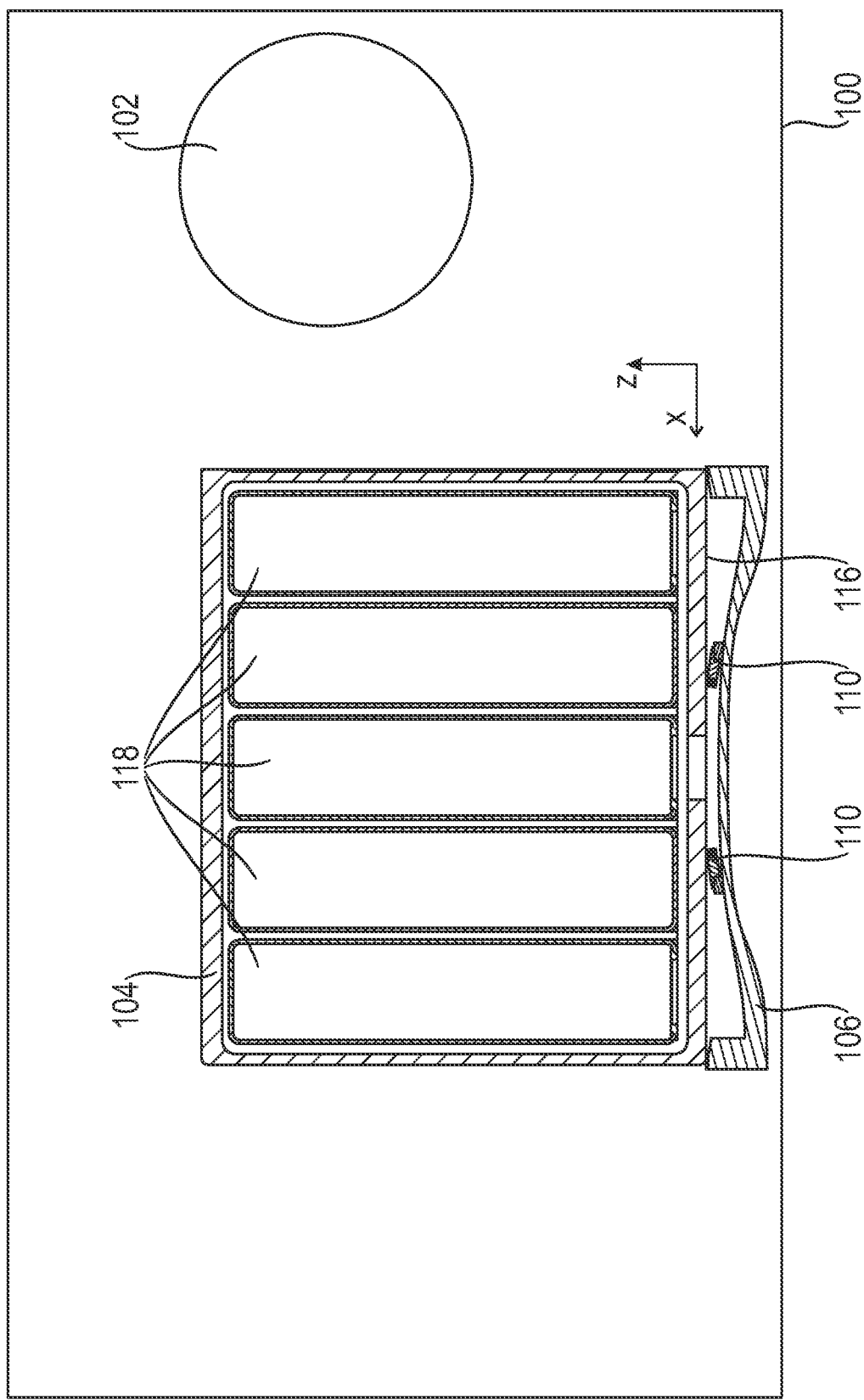

FIG. 2 shows a side view of the vehicle 100 with the bulkhead 110 in a folded position.

Figure 3:
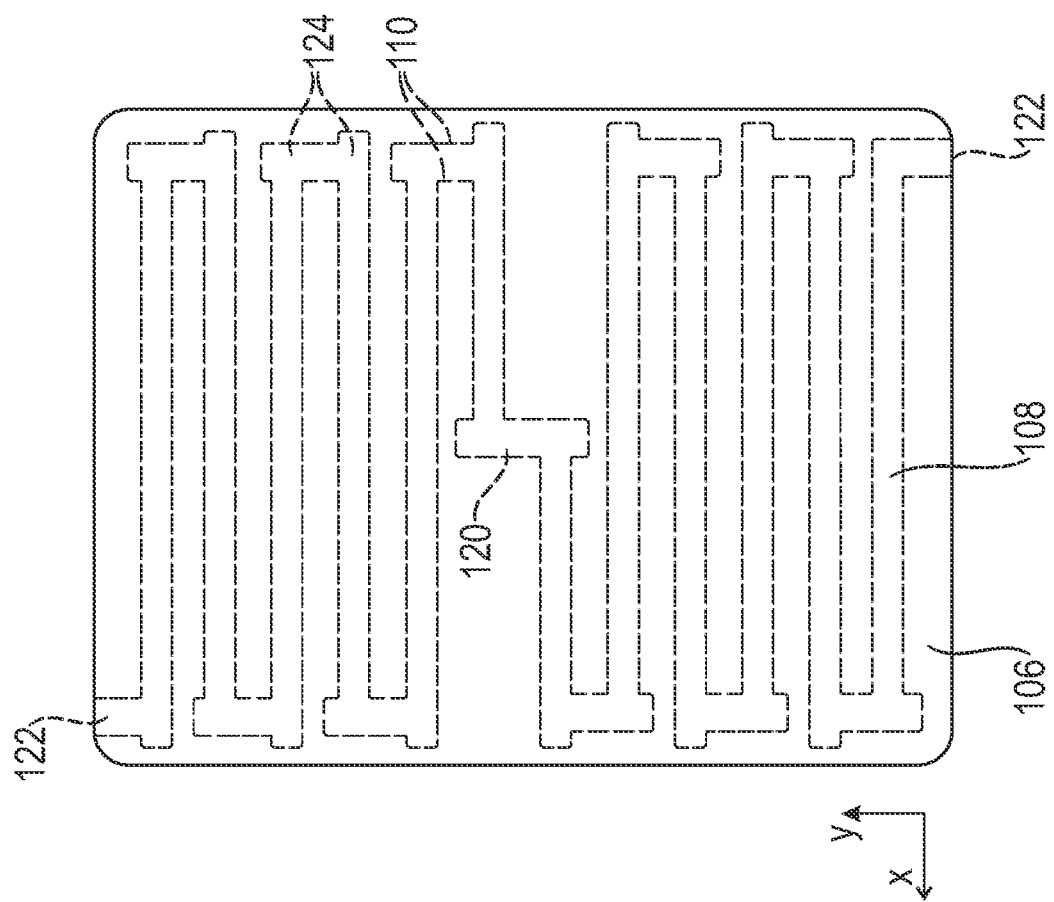

In FIG. 3, a view of the underride protection plate 106 with a meandering gas channel 108 is shown. In the example, the gas channel 108 extends from the centrally arranged degassing region 120 on two sides of the underride protection plate 106 in the y-direction, meandering respectively to one outlet 122 each, through which the gas from the gas channel 108 can escape into the environment or to other gas-conducting parts of the vehicle 100. In the example shown in FIG. 3, a plurality of bulkheads 110 are configured, which extend on both sides of the gas channel 108 in the y-direction between two deflection sites 124 that are directly adjacent in the y-direction.

Additionally, or in a further example, the bulkhead 110 comprises a target breaking point instead of the flexible region at the first edge 112 or between the first edge 112 and the second edge 114. The target breaking point extends at least partially in the direction of the first edge 112 and/or the second edge 114.

The target breaking point is configured so as to break upon a folding of the bulkhead 110 from a predetermined deformation of the bulkhead 110 in the region of the target breaking point. The target breaking point may comprise a portion that is frangible, slit, scored or crushable that is configured to be deformed, collapsed, broken, etc., upon being exposed to a predetermined force.

What is claimed is:

1. A vehicle comprising:
a battery system for powering an electric drive of the vehicle,
an underride protection plate arranged in the vehicle at a location that is at least partially beneath the battery system,
a gas channel disposed between the battery system and the underride protection plate, and
at least one bulkhead having a first edge attached to the underride protection plate, wherein the bulkhead extends from the first edge in a direction of the battery system to a second edge of the bulkhead, wherein the bulkhead at least partially forms a part of the gas channel, wherein the bulkhead is configured to fold in an event of an upwards mechanical load on the underride protection plate at the first edge or between the first edge and the second edge,
wherein the battery system comprises a battery housing having an opening that opens into and fluidly communicates with the gas channel, and wherein the gas channel is delimited in part by the at least one bulkhead.

2. The vehicle according to claim 1, wherein the bulkhead is attached to the underride protection plate via a region that is flexible in material and/or shape.

3. The vehicle according to claim 1, wherein the bulkhead has a return force in a flexible region that pushes the second edge in a direction towards the battery system.

4. The vehicle according to claim 1, wherein the bulkhead comprises a seal, which is arranged at least partially on the second edge so as to face the battery system.

5. The vehicle according to claim 4, wherein, in an installation position of the bulkhead, the bulkhead extends diagonally to produce a contact pressure between the seal and the battery system.

6. The vehicle according to claim 1, wherein, in an installation position of the bulkhead, the bulkhead is arranged at an oblique angle relative to the underride protection plate, wherein the gas channel tapers in a direction of the second edge.

7. The vehicle according to claim 1, wherein, in an installation position of the bulkhead, the bulkhead extends diagonally from the battery system toward the underride protection plate, wherein the bulkhead is configured to fold in a direction of the underride protection plate at the first edge or between the first edge and the second edge.

8. The vehicle according to claim 1, wherein the bulkhead has a target breaking point at the first edge or between the first edge and the second edge that extends at least partially in a direction of the first edge and/or the second edge.

9. The vehicle according to claim 8, wherein the portion of the bulkhead having a target breaking point is configured so as to break upon a folding of the bulkhead from a predetermined deformation of the bulkhead in a region of the target breaking point.

10. The vehicle according to claim 1, wherein the gas channel includes a central degassing region that registers with the opening in the battery housing.

11. The vehicle according to claim 10, wherein the central degassing region is disposed at a center of the underride protection plate.

12. The vehicle according to claim 10, wherein the gas channel extends along a first gas channel portion from the central degassing region in a first direction toward a first outlet formed in the underride protection plate.

13. The vehicle according to claim 12, wherein the gas channel extends along a second gas channel portion from the central degassing region in a second direction toward a second outlet formed in the underride protection plate.

14. The vehicle according to claim 13, wherein the first and second outlets are disposed at opposite ends of the underride protection plate.

15. The vehicle according to claim 13, wherein the first and second outlets are disposed at opposite corners of the underride protection plate.

16. The vehicle according to claim 13, wherein each of the first and second gas channel portions have a meandering path.

17. The vehicle according to claim 13, wherein each of the first and second gas channel portions are delimited one or more of said bulkheads that forms walls of the first and second gas channel portions.

* * * * *